United States Statutory Invention Registration [19]

[11] Reg. Number: H438

Viksne et al.

[43] Published: Mar. 1, 1988

[54] FLUID TANK SOUNDING TUBE CHECK VALVE

[75] Inventors: Janis I. Viksne, Alexandria, Va.; Thomas S. Allen, Newport, R.I.

[73] Assignee: The United States of America as represented by the Secretary of the Navy, Washington, D.C.

[21] Appl. No.: 858,986

[22] Filed: May 2, 1986

[51] Int. Cl.[4] ..... F16K 17/34

[52] U.S. Cl. ..... 137/519.5; 137/202; 137/329.3; 137/533.11

[58] Field of Search ..... 33/126.4 R, 126.7 R; 73/149, 428, 863.85, 863.86; 137/202, 322, 329.3, 533.11, 519.5, 901

[56] References Cited

U.S. PATENT DOCUMENTS

| | | | |
|---|---|---|---|
| 163,458 | 5/1875 | Chabot | 137/409 |
| 199,307 | 1/1878 | Naeher | 137/533.11 X |
| 924,641 | 6/1909 | Crispin | 137/202 |
| 1,755,458 | 5/1929 | Oleszko | 137/409 |
| 2,616,512 | 4/1950 | Coon | 182/25 |
| 2,919,670 | 11/1955 | Clark et al. | 114/185 |
| 3,628,559 | 12/1971 | Branko | 137/202 |
| 3,850,191 | 11/1974 | Brown | 137/271 |
| 4,040,441 | 8/1977 | Brown et al. | 137/519.5 |
| 4,069,840 | 1/1978 | Brown et al. | 137/533.11 |
| 4,266,605 | 5/1981 | LaBorde | 137/519.5 X |

FOREIGN PATENT DOCUMENTS

| | | | |
|---|---|---|---|
| 321486 | 10/1934 | Italy | 137/519.5 |

*Primary Examiner*—Charles T. Jordan
*Assistant Examiner*—Michael J. Carone
*Attorney, Agent, or Firm*—Luther A. Marsh

[57] ABSTRACT

A shipboard fuel tank sounding tube that allows safer operation by preventing overflow of the fuel tank during filling yet allows the passage of depth sounding rods and sampling probes wherein a light weight floating ball check value located on a prescribed path near the top of the tank is lifted upon filling of the tank, to a seated position yet is shifted upon entrance of a depth sounding rod and sampling probe to check tank fullness.

7 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

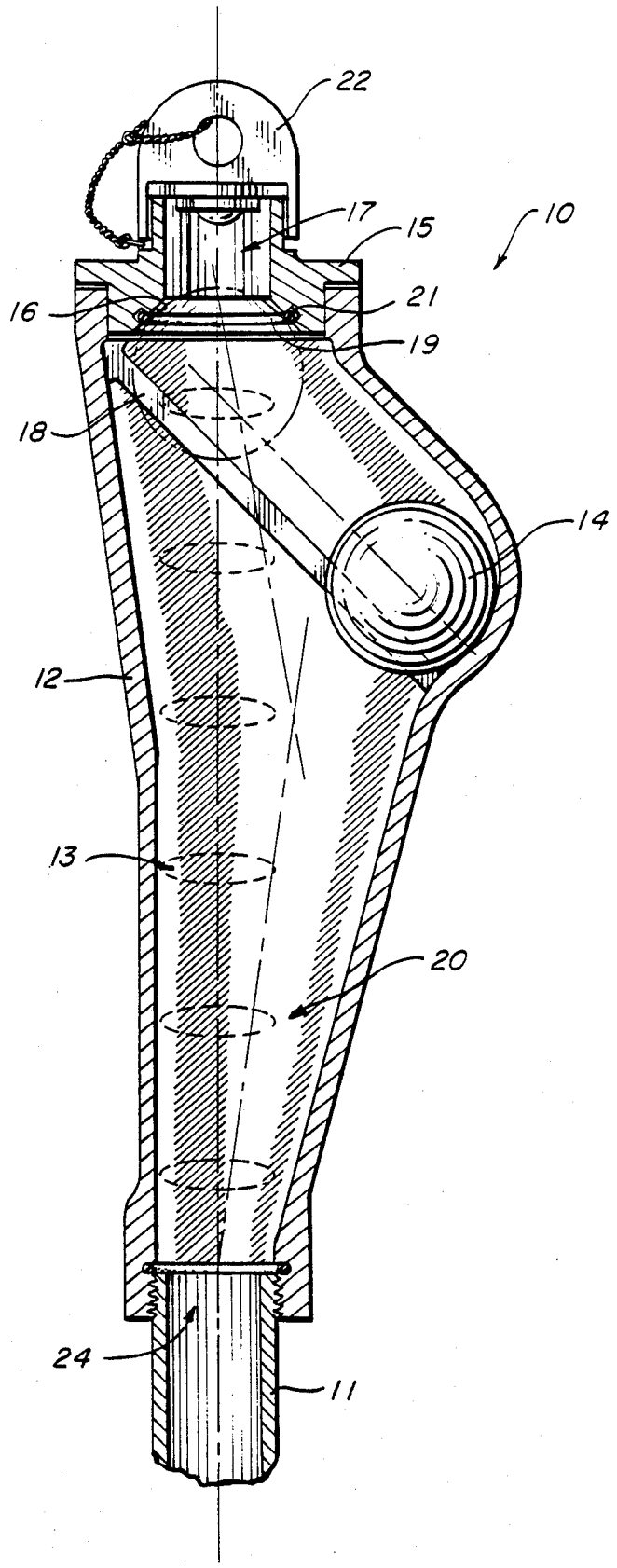
22
17
15
10
16
21
19
18
14
12
13
20
24
11

FLUID TANK SOUNDING TUBE CHECK VALVE

BACKGROUND OF THE INVENTION

1. Field of the Invention

The present invention relates generally to an apparatus for controlling fluid flow, and specifically to a floating ball check valve for a shipboard fuel tank sounding tube.

2. Prior Art

Large ships, particularly aircraft carriers, require numerous shipboard fuel tanks to service the ship, other vehicles, and equipment. A shipboard fuel tank requires a sounding tube through which depth sounding rods and sampling instruments may be passed to measure fuel levels, sample fuel for contamination, and monitor tank bottom water and sediment. The sounding tube therefore requires an unobstructed passage for insertion and removal of these depth sounding rods and sampling instruments.

Current sounding tubes for shipboard fuel tanks are potential safety hazards. Shipboard fuel tanks are filled using high pressure fuel lines. When a tank approaches full level, fuel tends to stream up the sounding tube and overflow therefrom. The sounding tube terminals are typically located in machinery spaces, away from the fuel intake. An overflow can therefore result in a spill in the order of hundreds of gallons before the spill is detected and corrective action is taken. These fuel spills, particularly highly flamable jet fuel spills in machinery spaces, create a substantial safety hazard.

To reduce the potential safety hazard of fuel spills, the sounding tubes of the prior art are typically capped. The most common cap design is a threaded cap screwed directly onto the sounding tube terminal. The cap is removed to allow unobstructed access for sounding and sampling, and securely replaced during normal ship operations. These screw caps often seize, or fuse, as contaminants (salt, sediment, etc.) tend to lodge within the threads. Secured screw caps also prevent venting of excess tank gas pressure, which increases the safety risk. These caps further require positive action by ship personnel, and during adverse operating conditions (eg. during heavy storm conditions and during combat status on military ships), replacement of sounding tube caps receives low priority. Screw caps are therefore often left unused, misused, or lost, thereby negating the intended safety enhancement.

Sounding tube caps having other closure designs (eg. quick release catches, friction fit, etc.) are also known in the prior art. These designs are subject to substantially similar drawbacks.

For these and other reasons, the sounding tube designs of the prior art are unsatisfactory. A need exists for an improved sounding tube design having an inherent anti-spill safety feature.

SUMMARY OF THE PRESENT INVENTION

It is therefore an object of the present invention to increase the safety characteristics of a shipboard fuel tank sounding tube.

It is another object of the present invention to reduce fuel spillage from a shipboard fuel tank sounding tube.

It is yet another object of the present invention to provide an automatic closing mechanism for a shipboard fuel tank sounding tube, while maintaining unobstructed access for depth sounding rods and fuel sampling instruments.

These objects and further advantages are achieved by the present invention, a floating ball check valve for a fluid tank sounding tube. The check valve comprises a generally upright valve housing having an inner clearance substantially in-line with the sounding tube and an elongated skewed conically tapered throat. The upper terminal of the valve housing comprises an annular valve seat disposed substantially in-line with the clearance. Guide ribs, inclinedly disposed exterior to the clearance, support and guide a floating ball valve from a resting position outside the clearance to an elevated position substantially below the annular valve seat. The elongated skewed conically tapered throat forms a nozzle from the lower terminal of the valve housing to the resting position of the floating ball valve such that fluid streaming into the valve housing through the valve throat is directed to impinge on the floating ball valve, forcing the floating ball valve to seat.

BRIEF DESCRIPTION OF THE DRAWING

A more complete appreciation of the present invention will become apparent from the following detailed description when considered in conjunction with the accompanying drawing wherein:

FIG. 1 is a cut-away illustration of a floating ball check valve for a shipboard fuel tank sounding tube.

DETAILED DESCRIPTION OF THE PREFERRED EMBODIMENT

A floating ball check valve of the present invention generally comprises a valve housing having an in-line clearance, a floating ball valve, an annular valve seat, guide ribs, and an elongated geometrically tapered throat.

The valve housing, a hollow conduit, stands generally upright, having an upper terminal, a lower terminal, and an in-line clearance therebetween. The overall geometry of the hollow conduit interior (chamber) may vary substantially, however, it must allow unobstructed in-line passage for the depth sounding rods and sampling instruments. The clearance requirements of the sounding tube instruments therefore determine the minimum clearance geometry of the chamber. These sounding tube instruments are typically cylindrical, to slidingly translate through a cylindrical sounding tube. The typical chamber must therefore comprise at minimum a cylindrical clearance having a diameter equal to the inner radius of the sounding tube, and substantially in-line therewith. Although this minimum clearance must be substantially in-line (co-axial) with the sounding tube, the overall geometry of the chamber need not be. It is therefore understood that although the chamber will hereinafter be referred to as an in-line cylindrical clearance, this refers to the minimum clearance rather than the overall chamber geometry.

Referring now to FIG. 1, the preferred embodiment of the present invention, a floating ball check valve for a shipboard fuel tank sounding tube, is generally illustrated. The check valve 10 generally comprises a valve housing 12 having an in-line cylindrical clearance 13, a floating ball valve 14, an annular valve seat 16, guide ribs 18, and an elongated skewed conically tapered throat 20.

The valve housing 12 may be composed of conventional materials, by conventional means. The preferred material is a wear and corrosion resistant material, most preferably stainless steel. The preferred method of generation is by casting.

The check valve 10 is designed to fit existing shipboard fuel tank sounding tubes. The lower valve housing terminal 24 is threaded to mesh with a conventional threaded sounding tube terminal 11 (eg. a nominal 1½ inch pipe sounding tube). It thereby replaces the screw cap of the prior art (not shown). The lower valve housing terminal 24 may be similarly adapted to fit other conventional sounding tube terminals.

The upper terminal of the valve housing 12 comprises an annular valve seat 16 for receiving a floating ball valve 14. The annular valve seat 16 may be integrally disposed in the upper terminal of the valve housing 12 (not shown), however, in the preferred embodiment, it is housed in a discrete valve seat member 15. In each embodiment, the annular valve seat 16 is disposed such that it encompasses the in-line cylindrical clearance 13. The inner diameter of the annular valve seat 16 is therefore at least as great as the cylindrical clearance 13 and the inner diameter of the sounding tube 11, thereby accommodating depth sounding rods and sampling instruments.

The preferred embodiment of check valve 10 comprises a discrete valve seat member 15 having a cylindrical channel 17 and an annular valve seat 16. Valve seat member 15 removably engages the valve housing 12 by conventional means (eg screw mesh, friction fit, etc.). This design provides access to the floating ball valve and facilitates periodic maintenance. The cylindrical channel 17 is substantially in-line with cylindrical clearance 13, and has a diameter sufficient to accommodate the depth sounding rods and fuel sampling instruments. It is most preferably equal to the diameter of the cylindrical clearance 13 and the inner diameter of the sounding tube 11, and in-line therewith. An annular valve seat 16 is disposed at the interior terminal of the cylindrical channel 17. The annular valve seat 16 may be generated by cutting a relief angle around the interior terminal of the cylindrical channel 17. To insure a leak proof seal between the floating ball valve 14 and the valve seat 16, a conventional O-ring 19 (eg. a vicon O-ring) may be disposed within an annular recess 21 in the annular valve seat 16. The valve seat member 15 is also shown loosely capped by an optional dust cover 22, which prevents contaminants from entering the valve housing 12 and permits venting of excess tank gas pressure.

The floating ball valve 14 may be composed of any conventional materials comparable with the tank fluid and environment. The floating ball valve 14 should be resistive to wear and corrosion. In the preferred embodiment, the floating ball valve comprises a lightweight, hollow, thin walled shell about a foam core. One example is a 2 inch diameter, 1/64 - 1/32 inch thick, stainless steel shell about a closed-cell polyethylene core.

Guide ribs 18 support and guide the floating ball valve 14 from a resting position outside the in-line cylindrical clearance 13 to an elevated position substantially below the annular valve seat 16. The guide ribs 18 are disposed within the valve housing 12 but outside the cylindrical clearance 13, and are therefore unobtrusive to depth sounding rods and sampling instruments. In the preferred embodiment, two guide ribs 18 are integrally disposed on opposing sides of the valve housing 12.

The valve housing 12 comprises an elongated skewed conically tapered throat 20. The throat 20 extends from the resting position of the floating ball valve 14 to the lower valve housing terminal 24. The centerline of the conical taper intersects the centerline of cylindrical clearance 13 proximate to the lower valve terminal 24, and is skewed away from the centerline of the cylindrical clearance 13, toward the resting position of the floating ball valve 14. In the preferred embodiment, the centerline of the throat 20 is skewed such that the cylindrical clearance 13 is tangential to the conically tapered throat 20 along the side opposite the resting position of the floating ball valve 14.

The check valve 10 of the present invention operates in two modes: high speed pressurized back-flow (streaming fluid); and low speed non-pressurized back-flow. When the back-flow fluid is streaming, the elongated skewed conically tapered throat 20 constitutes a nozzle, directing the fluid flow and activating the floating ball valve 14. As the pressurized fluid streams into the valve housing 12 through the lower valve housing terminal 24, it expands into the elongated skewed conically tapered throat 20 and is thereby nozzled to impinge upon the floating ball valve 14. The floating ball valve 14 is thereby driven up the guide ribs 18 to the annular valve seat 16. This nozzling effect substantially eliminates the volume of spills due to pressurized streaming fluid. When the back-flow is non-streaming, the present check valve 10 operates substantially as the floating ball check valves of the prior art; gravity maintains the floating ball valve 14 in the resting position until floated to the seat by fluid backing up the in the valve.

Numerous modifications and variations of the present invention are possible in light of the above teachings. It is therefore to be understood that within the scope of the appended claims, the invention may be practiced otherwise than as specifically described herein.

We claim:

1. For a fluid tank sounding tube into which depth sounding and fluid sampling instruments can be inserted, said sounding tube being subject to a streaming backflow of fluid, a floating ball check valve, comprising:

a floating ball valve;

a generally upright valve housing having an upper terminal, a lower terminal, a clearance therebetween, guide ribs, and an elongated geometrically tapered throat;

said clearance being substantially in-line with the sounding tube, allowing unobstructed passage for said depth sounding and fluid sampling instruments;

said upper terminal having an annular valve seat, substantially encompassing said clearance, internally oriented, and allowing unobstructed passage for said depth sounding and fluid sampling instruments;

said lower terminal being in fluid communication with said sounding tube;

said guide ribs being inclinedly disposed within said valve housing, affixed thereto, exterior to said clearance, and supporting and guiding said floating ball valve from a resting position outside said clearance to an elevated position substantially below said annular valve seat; and, said elongated geometrically tapered throat extending from said lower terminal to the resting position of said floating ball valve, wherein fluid streaming through said lower terminal into said valve housing is nozzled, directing the stream to impinge against said floating ball valve and forcing said floating ball valve to seat.

2. The apparatus recited in claim 1, said upper terminal further comprising:

a discrete valve seat housing, removably engaging said valve housing, and having a cylindrical channel;

said cylindrical channel being substantially in-line with said clearance and allowing unobstructed passage for said depth sounding and fluid sampling instruments; and, said annular valve seat being disposed at the interior terminal of said cylindrical channel.

3. The apparatus recited in claim 1, wherein said elongated geometrically tapered throat is concially tapered.

4. The apparatus recited in claim 3 wherein the centerline of said concial taper is skewed toward the resting position of said floating ball valve, such that said concial taper is tangential to said clearance on the side opposite said floating ball valve.

5. The apparatus recited in claim 1, wherein said floating ball valve is a stainless steel shell about a closed cell polyethylene core.

6. The apparatus recited in claim 1, wherein said lower valve terminal is threaded to mesh with a threaded sounding tube terminal.

7. The apparatus recited in claim 1, wherein said guide ribs are integrally disposed within the walls of said valve housing.

* * * * *